United States Patent
Klotsche et al.

(10) Patent No.: US 12,301,494 B2
(45) Date of Patent: May 13, 2025

(54) SCHEDULING IN CLOUD RADIO ACCESS NETWORK

(71) Applicant: Nokia Solutions and Networks Oy, Espoo (FI)

(72) Inventors: Ralf Klotsche, Neuenburg (DE); Hans Peter Schefczik, Erlangen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 283 days.

(21) Appl. No.: 17/785,576

(22) PCT Filed: Dec. 30, 2019

(86) PCT No.: PCT/EP2019/087129
§ 371 (c)(1),
(2) Date: Jun. 15, 2022

(87) PCT Pub. No.: WO2021/136578
PCT Pub. Date: Jul. 8, 2021

(65) Prior Publication Data
US 2023/0024678 A1    Jan. 26, 2023

(51) Int. Cl.
*H04L 5/00* (2006.01)
*H04W 16/10* (2009.01)
(Continued)

(52) U.S. Cl.
CPC .......... *H04L 5/0048* (2013.01); *H04W 16/10* (2013.01); *H04W 72/1263* (2013.01); *H04W 72/20* (2023.01); *H04W 72/569* (2023.01)

(58) Field of Classification Search
CPC ... H04W 16/10; H04W 72/569; H04W 72/20; H04W 72/1263; H04L 5/0048
See application file for complete search history.

(56) References Cited

U.S. PATENT DOCUMENTS

| 2016/0156563 A1* | 6/2016 | Timner | H04L 1/0033 |
| | | | 370/230 |
| 2017/0250747 A1* | 8/2017 | Reinhardt | H04B 7/0619 |

(Continued)

FOREIGN PATENT DOCUMENTS

| CN | 102612093 A | 7/2012 |
| EP | 3016466 A1 | 5/2016 |

(Continued)

OTHER PUBLICATIONS

International Search Report and Written Opinion received for corresponding Patent Cooperation Treaty Application No. PCT/EP2019/087129, dated Aug. 18, 2020, 12 pages.

(Continued)

*Primary Examiner* — Chi Ho A Lee
*Assistant Examiner* — Andrew Lee
(74) *Attorney, Agent, or Firm* — SQUIRE PATTON BOGGS (US) LLP

(57) ABSTRACT

This document discloses a solution for scheduling resources in a network using split frequency domain scheduling and time domain scheduling. According to an embodiment, a method for a frequency-domain scheduler comprises: receiving, by the frequency-domain scheduler from a first time domain scheduler employing a first scheduling policy to schedule time domain resources, a first scheduling request comprising a first priority indicator; receiving, by the frequency-domain scheduler from a second time domain scheduler employing a second scheduling policy different from the first scheduling policy, a second scheduling request comprising a second priority indicator provided on the same scale as the first priority indicator; and scheduling, by the frequency-domain scheduler, frequency domain resources to the first time domain scheduler and the second time domain (Continued)

scheduler on the basis of the first priority indicator and the second priority indicator.

14 Claims, 5 Drawing Sheets

(51) Int. Cl.
*H04W 72/1263* (2023.01)
*H04W 72/20* (2023.01)
*H04W 72/566* (2023.01)

(56) References Cited

U.S. PATENT DOCUMENTS

| | | | |
|---|---|---|---|
| 2018/0006696 A1* | 1/2018 | Yue | H04B 7/0617 |
| 2018/0020470 A1* | 1/2018 | Zhuang | H04W 72/27 |
| 2019/0090229 A1 | 3/2019 | Iwai et al. | |
| 2019/0124667 A1* | 4/2019 | Comsa | H04W 72/12 |
| 2020/0163108 A1* | 5/2020 | Lin | H04L 5/0053 |
| 2020/0296745 A1* | 9/2020 | Inokuchi | H04W 72/566 |
| 2020/0296749 A1* | 9/2020 | Freda | H04W 28/0268 |
| 2022/0302979 A1* | 9/2022 | Hao | H04L 5/0051 |
| 2023/0164635 A1* | 5/2023 | Kumar | H04W 28/24 370/329 |

FOREIGN PATENT DOCUMENTS

| | | |
|---|---|---|
| EP | 2849524 B1 | 3/2017 |
| JP | 2017-175348 A | 9/2017 |
| WO | 2016/074702 A1 | 5/2016 |
| WO | 2017/163543 A1 | 9/2017 |
| WO | 2019/080997 A1 | 5/2019 |
| WO | 2019/185130 A1 | 10/2019 |

OTHER PUBLICATIONS

Communication pursuant to Article 94(3) EPC dated Sep. 23, 2024 issued in corresponding European Patent Application No. 19 829 657.6.

Chinese Office Action, with English machine translation, corresponding to CN Application No. 201980103403.X, dated Dec. 16, 2024.

* cited by examiner

SCHEDULING IN CLOUD RADIO ACCESS NETWORK

RELATED APPLICATION

This application was originally filed as PCT Application No. PCT/EP2019/087129 on Dec. 30, 2019, each of which is incorporated herein by reference in its entirety.

FIELD

The exemplary and non-limiting embodiments of the invention relate generally to wireless communication systems. Embodiments of the invention relate especially to apparatuses, methods, and computer program products for scheduling in communication networks.

BACKGROUND

Wireless communication systems are under constant development. Currently the so called 5th generation (5G) of mobile communication network is under development. The future communication networks should have a flexible architecture that is able to adapt to a multitude of different use cases, users, sensors, service requirements and network deployments. This is not limited to the usual separation of control from user traffic, but it also has an effect on the structure of the system. It must be decided where to process certain functions of the 5G mobile network.

One possible implementation of realising a flexible communication system is to utilise remote radio heads (RRH) and a cloud based realisation of at least part of the infrastructure of the system. A remote radio head comprises a part of the elements of a conventional base station. Typically, a remote radio head comprises radio frequency equipment, analogue-to-digital/digital-to-analogue converters and up/down converters, for example. Rest of the base station functionality and infrastructure of the system may be situated elsewhere. In a Cloud Radio Access Network (Cloud-RAN) network functions can run on a pool of computing resources including hardware accelerators for special physical (PHY) layer tasks.

SUMMARY

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a frequency domain scheduler of a network, comprising means for performing: receiving, from a first time domain scheduler employing a first scheduling policy to schedule time domain resources, a first scheduling request comprising a first priority indicator; receiving, from a second time domain scheduler employing a second scheduling policy different from the first scheduling policy, a second scheduling request comprising a second priority indicator provided on the same scale as the first priority indicator; and scheduling frequency domain resources to the first time domain scheduler and the second time domain scheduler on the basis of the first priority indicator and the second priority indicator.

In an embodiment, the first priority indicator is within a first priority range assigned to the first time domain scheduler, and the second priority indicator is within a second priority range assigned to the second time domain scheduler, and wherein the first priority range differs from the second priority range.

In an embodiment, the first priority indicator is within a first priority range assigned to the first time domain scheduler, and the second priority indicator is within a second priority range assigned to the second time domain scheduler, and wherein the means are configured to clip at least one of the first priority range and the second priority range.

In an embodiment, the means are configured to schedule frequency domain resources to the first and second time domain schedulers within a cell of the network where the first time domain scheduler schedules time domain resources within a first network slice in the cell and where the second time domain scheduler schedules time domain resources within a second network slice in the cell.

In an embodiment, the means are configured to receive, before performing said scheduling, multiple scheduling requests from each of the first time domain scheduler and the second time domain scheduler, each of the multiple scheduling requests being associated with a different transmission request from a terminal device and the multiple scheduling requests comprising various priority indicators, and to schedule the frequency domain resources per scheduling request on the basis of the priority indicators.

In an embodiment, the first priority indicator indicates a higher priority on the scale than the second priority indicator, and, thus, the means are configured to schedule the frequency domain resources to the first time domain scheduler before scheduling the frequency domain resources to the second time domain scheduler.

In an embodiment, the means are configured to perform the frequency-domain scheduling per transmission time interval of the network.

According to an aspect, there is provided an apparatus for a time domain scheduler of a network, comprising means for performing: determining to schedule a time-frequency resource to a terminal device; in response to said determining, determining a scheduling priority of the terminal device according to a scheduling policy of the apparatus and computing, on the basis of the scheduling priority, a priority indicator provided on a normalized scale common with at least one other time domain scheduler using the same frequency domain scheduler; transmitting a scheduling request to a frequency domain scheduler, the scheduling request comprising the priority indicator; receiving, from the frequency domain scheduler a scheduling response indicating a frequency domain resource scheduled to the apparatus; and scheduling time domain resources from the frequency domain resource to the terminal device according to the scheduling policy.

In an embodiment, the means are configured to store and use a priority range limiting the possible values of the priority indicator.

In an embodiment, the means are configured to schedule time domain resources of one of multiple network slices in the cell, and wherein the frequency domain scheduler is common to multiple time domain schedulers associated with different network slices in the cell.

According to an aspect, there is provided a method for a frequency domain scheduler of a network, comprising:

receiving, by the frequency-domain scheduler from a first time domain scheduler employing a first scheduling policy to schedule time domain resources, a first scheduling request comprising a first priority indicator; receiving, by the frequency-domain scheduler from a second time domain scheduler employing a second scheduling policy different from the first scheduling policy, a second scheduling request comprising a second priority indicator provided on the same scale as the first priority indicator; and scheduling, by the frequency-domain scheduler, frequency domain resources to the first time domain scheduler and the second time domain scheduler on the basis of the first priority indicator and the second priority indicator.

In an embodiment, the first priority indicator is within a first priority range assigned to the first time domain scheduler, and the second priority indicator is within a second priority range assigned to the second time domain scheduler, and wherein the first priority range differs from the second priority range.

In an embodiment, the first priority indicator is within a first priority range assigned to the first time domain scheduler, and the second priority indicator is within a second priority range assigned to the second time domain scheduler, and wherein the frequency-domain scheduler clips at least one of the first priority range and the second priority range.

In an embodiment, the frequency-domain scheduler schedules frequency domain resources to the first and second time domain schedulers within a cell of the network where the first time domain scheduler schedules time domain resources within a first network slice in the cell and where the second time domain scheduler schedules time domain resources within a second network slice in the cell.

In an embodiment, the frequency-domain scheduler receives, before performing said scheduling, multiple scheduling requests from each of the first time domain scheduler and the second time domain scheduler, each of the multiple scheduling requests being associated with a different transmission request from a terminal device and the multiple scheduling requests comprising various priority indicators, and schedules the frequency domain resources per scheduling request on the basis of the priority indicators.

In an embodiment, the first priority indicator indicates a higher priority on the scale than the second priority indicator and, as a response, the frequency-domain scheduler schedules the frequency domain resources to the first time domain scheduler before scheduling the frequency domain resources to the second time domain scheduler.

In an embodiment, the frequency-domain scheduling is performed per transmission time interval of the network.

According to an aspect, there is provided a method for a time domain scheduler of a network, comprising: determining, by the time domain scheduler, to schedule a time-frequency resource to a terminal device; in response to said determining, determining by the time domain scheduler a scheduling priority of the terminal device according to a scheduling policy of the apparatus and computing, on the basis of the scheduling priority, a priority indicator provided on a normalized scale common with at least one other time domain scheduler using the same frequency domain scheduler; transmitting, by the time domain scheduler, a scheduling request to a frequency domain scheduler, the scheduling request comprising the priority indicator; receiving, by the time domain scheduler from the frequency domain scheduler a scheduling response indicating a frequency domain resource scheduled to the apparatus; and scheduling, by the time domain scheduler, time domain resources from the frequency domain resource to the terminal device according to the scheduling policy.

In an embodiment, the time domain scheduler stores and uses a priority range limiting the possible values of the priority indicator.

In an embodiment, the time domain scheduler schedules time domain resources of one of multiple network slices in the cell, wherein the frequency domain scheduler is common to multiple time domain schedulers associated with different network slices in the cell.

According to an aspect, there is provided a computer program product embodied on a distribution medium readable by a computer and comprising program instructions which, when loaded into the computer, execute a computer process for a frequency-domain scheduler of a network, the computer process comprising: receiving, by the frequency-domain scheduler from a first time domain scheduler employing a first scheduling policy to schedule time domain resources, a first scheduling request comprising a first priority indicator; receiving, by the frequency-domain scheduler from a second time domain scheduler employing a second scheduling policy different from the first scheduling policy, a second scheduling request comprising a second priority indicator provided on the same scale as the first priority indicator; and scheduling, by the frequency-domain scheduler, frequency domain resources to the first time domain scheduler and the second time domain scheduler on the basis of the first priority indicator and the second priority indicator.

According to an aspect, there is provided a computer program product embodied on a distribution medium readable by a computer and comprising program instructions which, when loaded into the computer, execute a computer process for a time-domain scheduler of a network, the computer process comprising: determining, by the time domain scheduler, to schedule a time-frequency resource to a terminal device; in response to said determining, determining by the time domain scheduler a scheduling priority of the terminal device according to a scheduling policy of the apparatus and computing, on the basis of the scheduling priority, a priority indicator provided on a normalized scale common with at least one other time domain scheduler using the same frequency domain scheduler; transmitting, by the time domain scheduler, a scheduling request to a frequency domain scheduler, the scheduling request comprising the priority indicator; receiving, by the time domain scheduler from the frequency domain scheduler a scheduling response indicating a frequency domain resource scheduled to the apparatus; and scheduling, by the time domain scheduler, time domain resources from the frequency domain resource to the terminal device according to the scheduling policy.

LIST OF DRAWINGS

Embodiments of the present invention are described below, by way of example only, with reference to the accompanying drawings, in which FIG. 1 illustrates an example of a communication environment where some embodiments of the invention may be applied FIGS. 2 and 3 are flowcharts illustrating some embodiments of the invention for performing scheduling of radio resources;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Some embodiments of the present invention are applicable to, a base station, eNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

Figure 1:
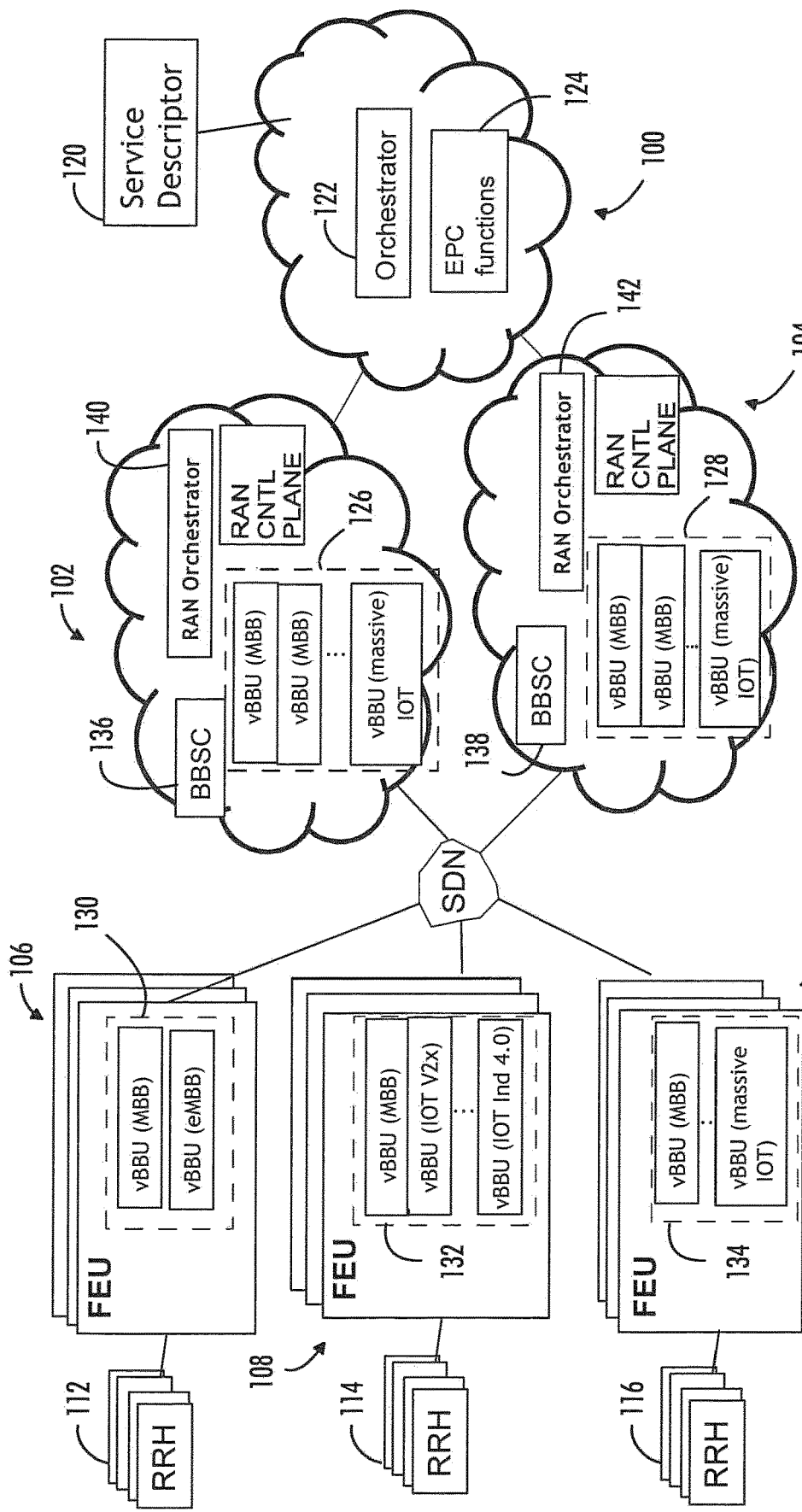

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the invention. Therefore, they need not to be discussed in more detail here.

In the example of FIG. 1, a Cloud Radio Access Network (Cloud-RAN) based system is shown. However, the embodiments described in these examples are not limited to the system illustrated in FIG. 1 which is merely an example of a possible system to which embodiments of the invention may be applied.

The simplified example of a network of FIG. 1 may be divided into three parts, or tiers: a Central Cloud 100, one or more Edge Clouds, EC, 102, 104, and a number of Flexible Front End Units (FEU) 106, 108, 110, to which a set of Remote Radio Heads, RRH, 112, 114, 116 are connected. In an embodiment, Flexible Front End Units may be connected to Edge Clouds via Software defined networks, SDN. Connections between FEUs and Edge Clouds may be denoted as mid haul. Edge Clouds may be connected to Central Cloud via a backhaul network. Connections between RRHs and FEUs may be denoted as front haul.

In an embodiment, different parts or tiers of the system perform different functions. Remote Radio Heads take care of the air interface and radio frequency operation. Typically Flexible Front End Units manage critical latency services. A Front End Unit is a pool of resources controlled with cloud methods. A FEU may be configured to provide ultra-reliable or low latency services to be allocated. The hardware used to realise FEU may be a server with dedicated hardware like accelerator boards. FEUs may locate relatively close to the RRHs, but the locations should be easy to access, maintain, cool, and power. In an embodiment, the connections between RRHs and FEUs are realised with fibre and the length of the connecting link is a few 100 meters.

In an embodiment, an Edge Cloud is a cloud providing dedicated radio services logically assigned to the network edge, but in a locally centralized way. Typically the service area may be for an area around 20 km diameter around RRHs, for example, depending on the transport network topology. By this aggregation pooling gains are achievable. As in the FEU also here hardware accelerators may be necessary, but the main components may be ordinary servers (off the shelf, OTS). The Edge Cloud hardware is easy to access, maintain, replace or update, cool, and power; but at a bigger scale, thus boosting pooling gains.

In 5G networks a slice concept is proposed. Slices are used for logical resource isolation. A network slice instance is a set of network functions and the resources for these network functions which are arranged and configured to form a complete logical network to meet certain network and quality of service (QoS) characteristics. Each slice may be dedicated to a given type of services having similar network characteristics. For example, one slice may take care of Mobile Broadband, MBB, or enhanced MBB, eMBB, another slice may manage ultra-reliable low latency connections (URLLC), and another slice may be responsible for Internet of Things, IoT, traffic. Another aspect of network slicing is that a certain entity such as a company may acquire a network slice for dedicated use. In the Central Cloud, Service Descriptor 120 take care of abstraction of slice descriptions with Key Performance Indicators, KPIs and location information. Orchestrator 122 is responsible for end-to-end slice and multi-tenancy management. Central cloud also comprises Enhanced Packet Core, EPC, functions 124.

In an embodiment, each Edge Cloud comprises a pool 126, 128 of base band units, BBUs. Each FEU may also have a pool 130, 132, 134 of base band units. A BBU summarizes all processing of the data plane and related control before the final modulation (in downlink direction, and demodulation in up-link direction). A BBU pool is a set of resources (such as central processing unit, CPUs, accelerators, memories) provided in a cloud to offer the processing of a BBU functionality. A virtual BBU, vBBU, is a set of BBU functionality floating in the cloud, composed of resources from the BBU pool to provide one or more services to a set of users or clients. Typically several vBBUs belong to one cell.

The Base Band Service Chainer, BBSC, 136, 138 is configured to control flexible base band processing and load balancing. RAN Orchestrators 140, 142, are responsible for Multi Slice/Tenancy deployment in Edge Cloud according requests of Orchestrator 122.

FIG. 1 illustrates an example where each FEU manages multiple network slices, represented by the pools of base band units 130 to 134. The latency and other quality-of-service (QoS) requirements of the different slices may differ. Furthermore, multiple FEUs may employ the same RRHs, as illustrated by layers associated with each FEU.

A scheduler implemented in a FEU, for example, has the task of allocating a set of limited radio resources to a set of bearers operational in a cell, in an attempt of complying with as many bearers' service level agreements (SLA) as possible. The bearers want to get their data delivered in time and, thus, compete for the radio resources. The network slicing adds another dimension to this problem: each slice needs different parameters and strategies for the scheduling. For example, slice types such as URLLC, IoT and (e)MBB differ in terms of their requirements for scheduling. With each emerging new slice type, new scheduling policies may be needed. Scaling on cloud level adds another dimension of complexity to the scheduler by varying the needed slice-specific processing power for scheduling and data processing.

Figure 2:
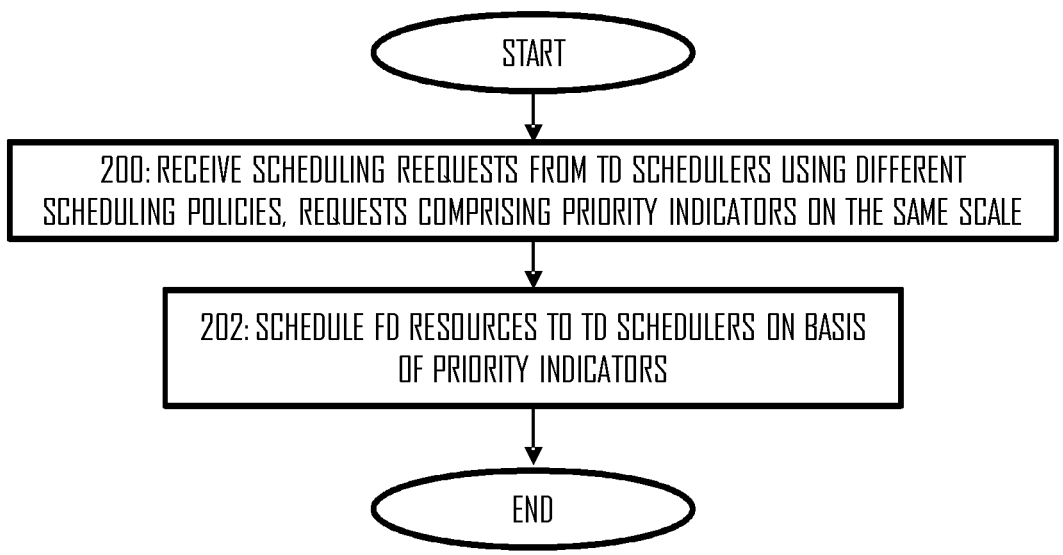
Figure 3:
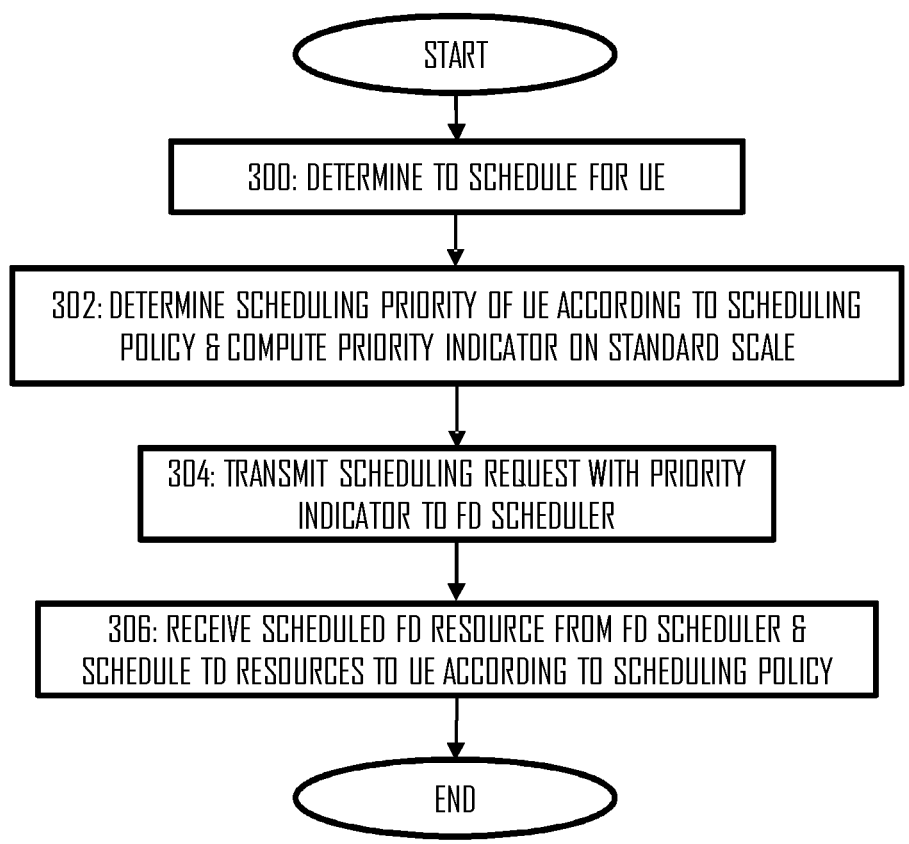

FIGS. 2 and 3 illustrate embodiments for performing scheduling in a network. The network may be a wireless network but, in some embodiments, the network is a wired network. The embodiments are based on splitting the scheduling into frequency-domain (FD) scheduling and time-domain (TD) scheduling. FIG. 2 illustrates a process from the perspective of an FD scheduler while FIG. 3 illustrate a process from the perspective of a TD scheduler.

Referring to FIG. 2, the process comprises as performed by an apparatus for the FD scheduler: receiving (block 200), from a first time domain scheduler employing a first scheduling policy to schedule time domain resources, a first scheduling request comprising a first priority indicator; receiving (block 200), from a second time domain scheduler employing a second scheduling policy different from the first scheduling policy, a second scheduling request comprising a second priority indicator provided on the same scale as the first priority indicator; and scheduling (block 202) frequency domain resources to the first time domain scheduler and the second time domain scheduler on the basis of the first priority indicator and the second priority indicator.

Referring to FIG. 3, the process comprises as performed by an apparatus for the TD scheduler: determining (block 300) to schedule a time-frequency resource to a terminal device; in response to said determining, determining (block 302) a scheduling priority of the terminal device according to a scheduling policy of the apparatus and computing, on the basis of the scheduling priority, a priority indicator provided on a normalized scale common with at least one other time domain scheduler using the same frequency domain scheduler; transmitting (block 304) a scheduling request to a frequency domain scheduler, the scheduling request comprising the priority indicator; receiving (block 306), from the frequency domain scheduler a scheduling response indicating a frequency domain resource scheduled to the apparatus; and scheduling (block 306) time domain resources from the frequency domain resource to the terminal device according to the scheduling policy.

The split of the scheduling and yet using the priorities on the common scale enables the TD schedulers to employ local policies in the TD scheduling as they see fit and according to the demand and service requirements (e.g. QoS) amongst the terminal devices (UEs) served by each TD scheduler, and yet it enables dynamic, flexible, and efficient utilization of the FD resources by the virtue of the centralized FD scheduler. It also enables flexible deployment and removal of the TD schedulers, e.g. when new network slices are introduced to or removed from the system.

Since the priority indicators are on the same scale, they are comparable with one another and, therefore, the value of the priority indicator directly indicates the priority with respect to the other priority indicators provided on the same scale. As a consequence, if the first priority indicator indicates a higher priority on the scale than the second priority indicator, the FD scheduler may schedule the frequency domain resources to the first time domain scheduler before scheduling the frequency domain resources to the second time domain scheduler. As a consequence, in a case of limited FD resources, the TD schedulers providing a higher-priority indicator will be scheduled first and have a higher probability of acquiring the FD resources for TD scheduling.

In an embodiment, the FD scheduler is common to multiple TD schedulers in a cell.

Figure 4:
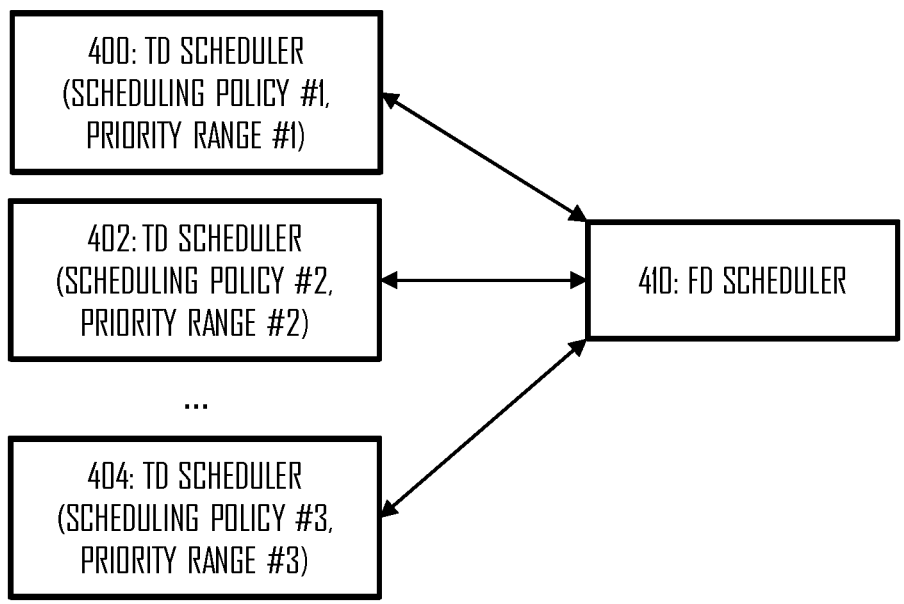
FIG. 4 illustrates an embodiment of split scheduling of time-frequency resources to bearers or terminal devices.
Figure 5:
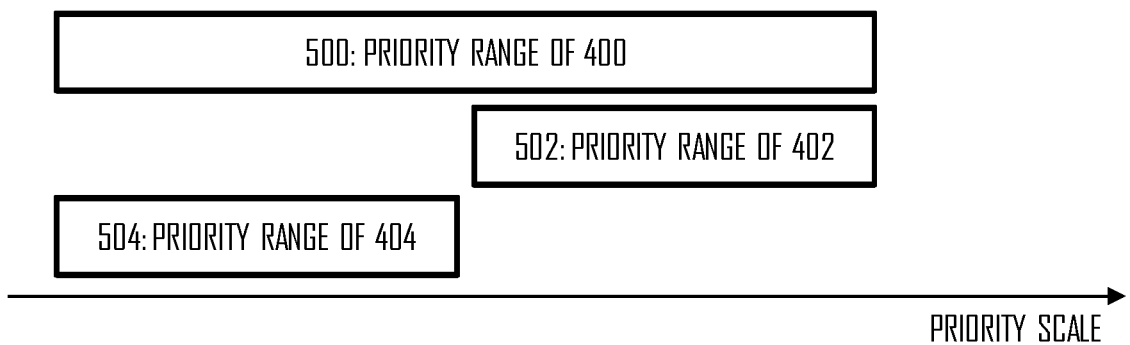
FIG. 5 illustrates an example of different priority ranges employed by different time-domain schedulers using the same frequency-domain scheduler.

FIG. 4 illustrates an embodiment of the split scheduling where a common FD scheduler 410 schedules FD resources to multiple TD schedulers 400 to 404 employing the different scheduling policies. The number of TD schedulers may depend on the implementation, e.g. a number of network slices in the system or cell. Each TD scheduler 400 to 404 may have a dedicated priority range assigned to the TD scheduler, and the TD scheduler may compute the priority indicator within the assigned priority range. The priority ranges of the different TD schedulers may differ from one another, thus forming prioritization amongst the TD schedulers. The priority range may be computed from the service requirements of bearers served by each TD scheduler. The service requirements may define QoS requirements such as 5QI values in the 5G systems, and specific priority ranges may be allocated to each QoS or 5QI value. FIG. 5 illustrates an example of the different priority ranges assigned to the TD schedulers 400 to 404.

Referring to FIG. 5, the TD scheduler 400 may have the broadest priority range that may be assigned to IoT slices, for example. The TD scheduler 402 may be assigned with a priority range from a higher end of the priority scale, and the priority range may be assigned to high priority slices such as the URLLC. The TD scheduler 404 may be assigned with a priority range from a lower end of the priority scale, and the priority range may be assigned to a slice that does not deliver high-priority traffic, e.g. an MBB slice.

In the embodiment of FIG. 5, the priority range 500 overlaps partially with the priority range 502, and the priority ranges 502 and 504 do not overlap. Statistically, this has the following effects in terms of which TD scheduler is prioritized over the other when competing for the FD resources requested from the FD scheduler. If two TD schedulers have fully overlapping priority ranges, they are treated in the same way and with maximum fairness. If two TD schedulers have partially overlapping priority ranges, one slice may be prioritized over the other. For example, since the priority range 500 is larger and the priority indicators statistically are distributed over the wider range and below the priority range 502, the TD scheduler 402 is statistically prioritized over the TD scheduler 400. However, in an isolated situation, depending on the values of the priority indicators provided by the TD schedulers 400 and 402, the TD scheduler 400 may be prioritized over the TD scheduler 402. If the TD schedulers have disjunctive priority ranges, such as the TD schedulers 402 and 404 have, one dominates over the other (402 over 404) but each slice may still be able to use the entire resources within the cell. This dimensioning is beneficial for e.g. the coexistence of URLLC and MBB slices where the high priority URLLC services are expected to occupy only a fraction of a cell's capacity, but require instantaneous scheduling.

Let us then elaborate a case where the full frequency capacity of the FD resources is in use and not all the scheduling requests can be accepted. In such a case, the TD scheduler 402 has the highest probability of getting FD resources scheduled while the TD scheduler 404 has the lowest probability, depending on a traffic situation in the TD scheduler. If such a congested case persists, it is possible that all TD schedulers tend to set the priority indicator to a higher end of the priority range. Thus, the higher the maximum priority is in the respective priority range, the higher is the probability of getting the FD resources. The priority range of the TD scheduler 404 ends first so it has the lowest probability of acquiring FD resources in a congested situation, while both TD schedulers 400 and 402 probably will get FD resources, the TD scheduler 402 probably having better chances than the TD scheduler 400, thanks to the smaller range at the high end of the priority scale.

In an embodiment, each TD scheduler 400 to 404 is configured to schedule time domain resources within a dedicated network slice in the cell, and the network slices may set different requirements for the scheduling policies. As a consequence, each TD scheduler managing a network slice may define different scheduling policies to be applied within the slice in the cell.

Figure 6:
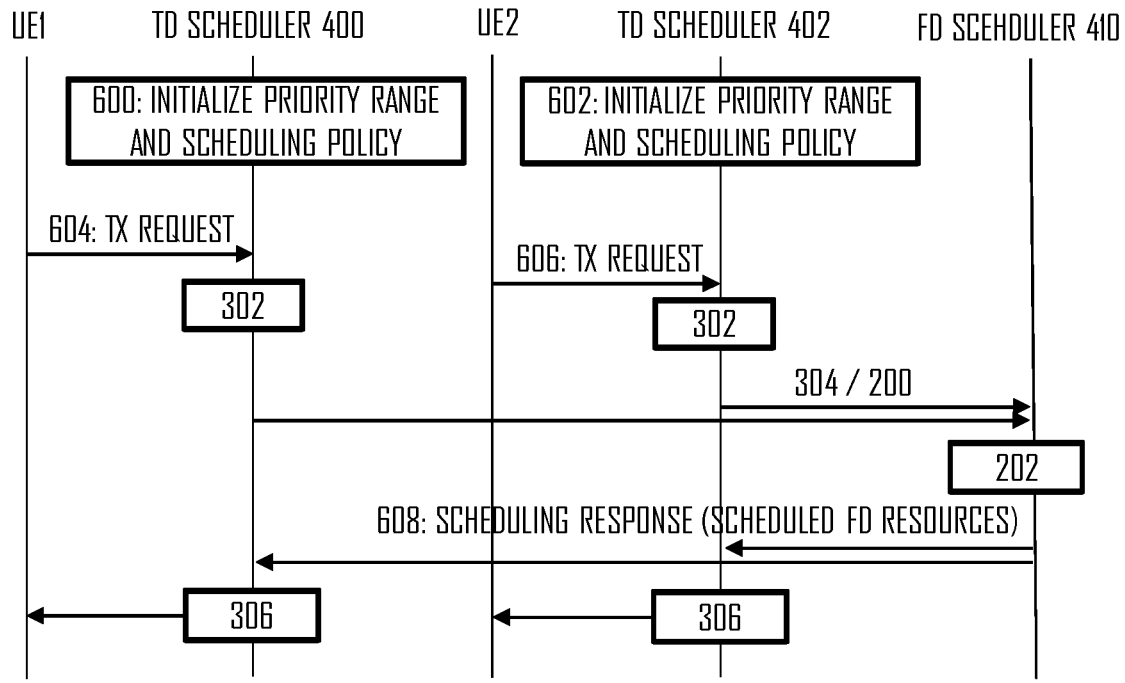
FIG. 6 illustrates a signalling diagram of communication between time-domain schedulers and a frequency-domain scheduler according to an embodiment.

Let us then elaborate the scheduling of FD resources with reference to a signalling diagram in FIG. 6. For the sake of simplicity, only two TD schedulers 400 and 402 are considered in this case and only one terminal device (UE) per TD scheduler. In a conventional situation, the number of TD schedulers as well as the number of UEs may be higher but the procedure still remains similar, only the scale changes.

Referring to FIG. 6, the TD schedulers 400 and 402 may initialize their scheduling in blocks 600 and 602, respectively. The initialization may comprise determining and storing the priority range for the TD scheduler. The priority range may be received from a radio access network (RAN) controller such as RAN intelligent controller (RIC) in a 5G system. The priority range may be dependent on the type of traffic the TD scheduler schedules, as described above. There are other ways of setting the priority range, e.g. a TD scheduler of an owner of the cell may have a better priority range than a TD scheduler belonging to a client or a visitor of the cell. The initialization may further comprise determining the scheduling policy. The scheduling policy may define TD-scheduler-specific rules for prioritizing different UEs within the network slice or TD resources scheduled by the TD scheduler. An example of such a scheduling policy starts with proportional fairness $$P = \frac{T^\alpha}{R^\beta}$$

where T=potential achievable data rate, R is a historical average data rate, α=weight of channel conditions, β=weight of the average data rate. For example, (α,β) equal to (0, 1) may represent a round robin principle, while (α,β) equal to (1, 0) may represent maximum throughput policy. (α,β) equal to (~1, ~1) represents proportionally fair scheduling.

By considering services capabilities within a slice managed by the TD scheduler, it is possible to tune α and β to balance efficiency and throughput of an individual bearer. This procedure of tuning can also be delegated to a control instance like a RIC. The TD scheduler may also monitor QoS parameters such as delay, achieved bit rate, and throughput and balance the TD scheduling of individual bearers within the slice. It may be beneficial for the overall throughput if the TD scheduler uses jitter allowed by service-level agreement to determine the scheduling priority. Such exploitation provides degrees of freedom in the optimization of the TD scheduling. The scheduling priority of individual bearers may be made by considering slice specific quality (QoS, 5QI) parameters such as transmission buffer status (number of packets waiting transmission), data rate, packet delay, packet loss rate, etc.

As an example, the following slice type specific scheduling policies may be employed selectively by the TD scheduler: for MBB traffic, elastic scheduling where leveraging allowed by delay and queue depth is used to boost spectral efficiency and limit the number of users per transmission time interval (TTI); for IoT traffic knowledge on families of objects/devices in the cell is used to balance bursty traffic, e.g. in a case of fire alarm, traffic from fire alarms may be prioritized higher than traffic from other objects/devices; for URLLC traffic, quasi-synchronous handshakes, known e.g. from industry busses, may be organized such that bursts are reduced and/or duplicate or multiple spontaneous events may be used to boost reliability within one TD scheduler.

The scheduling policy may define an algorithm for calculating an arbitrary (local) priority value f(P) for each bearer needing the TD scheduling. The priority value may be between 0.0 and 1.0 but the range of the local priority value may be any. For example, any one of the following equations may be used by the algorithm:

$$f(P)_l = a*P + b,$$

a and b defining a QoS class $$f(P)_s = a*e^{bx}*P,$$

a and b defining a QoS class, x represents the amount of traffic in the transmission buffer for exponential boost of priority depending on a present service QoS requirement Furthermore, the initialization may comprise determining a rule for mapping the above-described local priority used in the scheduling policy of the TD scheduler to the priority indicator provided on the standard scale common to the TD schedulers 400, 402. In this step, the priority range of allowed priority indicators is used to ascertain that the priority indicator is within the range. The rule may be precoded into the TD scheduler, or it may be received from the RIC, for example.

Upon determining to schedule a TD resource to an UE, e.g. upon receiving a transmission request from the UE (blocks 604, 606) or upon detecting downlink traffic destined to the UE, the TD scheduler may execute block 302. Block 302 may comprise computing the scheduling priority of the UE by using the scheduling policy of the TD scheduler, and the scheduling priority may include computation of the f(P), for example. Then, the TD scheduler may convert the scheduling priority into the priority indicator on the standard scale, e.g. by using the following equation:

$$(Max\_Index - Min\_Index)*f(P) + Min\_Index$$

where, Max_Index and Min_Index define a maximum value and a minimum value of the priority range of the TD scheduler on the common, standard scale, respectively. The computed priority indicator is then transmitted to the FD scheduler in steps 304, and the FD scheduler receives the priority indicators in step 200.

Then, the FD scheduler may execute block 202 and schedule the FD resources to the TD schedulers that have sent the scheduling requests. The FD scheduler 410 may wait, before performing said scheduling, for reception of multiple scheduling requests from each TD scheduler, wherein each of the multiple scheduling requests is associated with a different a terminal device. Each scheduling request may include a separately computed priority indicator. Upon receiving a sufficient amount of scheduling requests or upon expiry of a time counting a time period for accumulating the scheduling requests, the FD scheduler executes block 202 and schedules the FD resources to the TD schedulers.

In an embodiment, the priority indicators are indices to a list stored in the FD scheduler, and the FD scheduler performs the frequency domain scheduling by scrolling through the list and assigning the frequency domain resources to the scheduling requests in the order where the priority indicators are comprised in the list. This reduces the computational complexity by avoiding sorting the received priority indicators. In a case where two priority indicators have the same value and are mapped to the same index, the FD scheduler may perform a determined contention resolution between the two scheduling requests, e.g. roll a dice.

As described above, each scheduling request may relate to a single bearer or UE. Accordingly, a TD scheduler may transmit multiple scheduling requests for a single FD scheduling 'run' of the FD scheduler.

Upon scheduling an FD resource for a scheduling request, e.g. one or more physical resource blocks (PRB), the FD scheduler may transmit a scheduling response to the TD scheduler from which the scheduling request was received (block 608). The scheduling response may indicate the scheduled FD resource. Upon receiving the scheduling response, the TD scheduler may scheduler TD resources from the scheduled FD resources to the respective bearer or UE (block 306).

In an embodiment, the scheduling request is transmitted on a protocol layer above a medium access control (MAC) layer, and the scheduling response is provided on the same layer. In another embodiment, the FD scheduler receives the scheduling request on the layer above the MAC and transmits the scheduling response on the MAC layer or on a physical layer to the TD scheduler. The TD scheduler may perform the TD scheduling on the MAC or physical layer and, thus, reception of the scheduling response on that layer may expedite the TD scheduling.

In some situations, the scheduling request may be rejected by the FD scheduler and, as a consequence, the TD scheduler cannot perform the TD scheduling for the corresponding bearer/UE.

In an embodiment, the frequency-domain scheduling is performed per transmission time interval of the wireless network. The TD schedulers may get, asynchronously to the TTI clock of the radio interface, transmission requests (either originated from the UEs or downlink buffers etc.) and decide a TTI for which the scheduling request is sent to the FD scheduler. The timing of the scheduling request may thus define implicitly the TTI for which the FD resources are requested.

Figure 7:
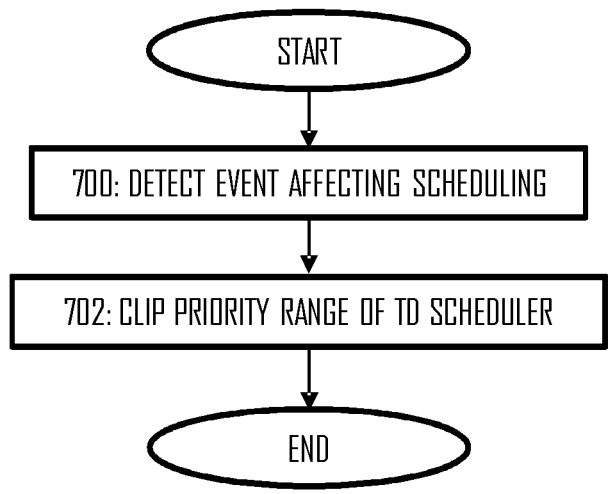
FIG. 7 illustrates an embodiment of a process for clipping a priority range assigned to a time-domain scheduler.

In an embodiment, the priority range assigned to a TD scheduler is clipped, e.g. upon detecting a determined event. The clipping may be performed by the TD scheduler itself or by the FD scheduler. FIG. 7 illustrates an embodiment of a process for said clipping. Referring to FIG. 7, the FD/TD scheduler detects an event affecting the scheduling in block 700. Upon detecting the event, the scheduler may determine a priority range to be clipped and, then, clip the priority range of the corresponding TD scheduler. The clipping may be made from a higher end of the priority range and/or from the lowed end of the priority range.

Let us describe a few examples where the clipping may be performed. For example, when the cell becomes congested and the FD resources cannot be scheduled to all scheduling requests, the FD scheduler may clip a priority range of at least one TD scheduler. Referring to FIG. 5, in such a situation the priority range 500 may be clipped from the higher end, for example, to make more room for the sensitive traffic of the TD scheduler 402, e.g. URLLC traffic, vehicle-to-vehicle (V2V) or vehicle-to-everything (V2X) traffic, video live streaming traffic, and interactive gaming traffic.

In an embodiment, the TD schedulers provide the local priority values in the scheduling requests, and the FD scheduler is configured to convert the local priority values into the common scale. In such an embodiment, the FD scheduler may be provided with information on the priority ranges of the TD schedulers and, in some embodiments, information on the scheduling policies of the TD schedulers.

Figure 8:
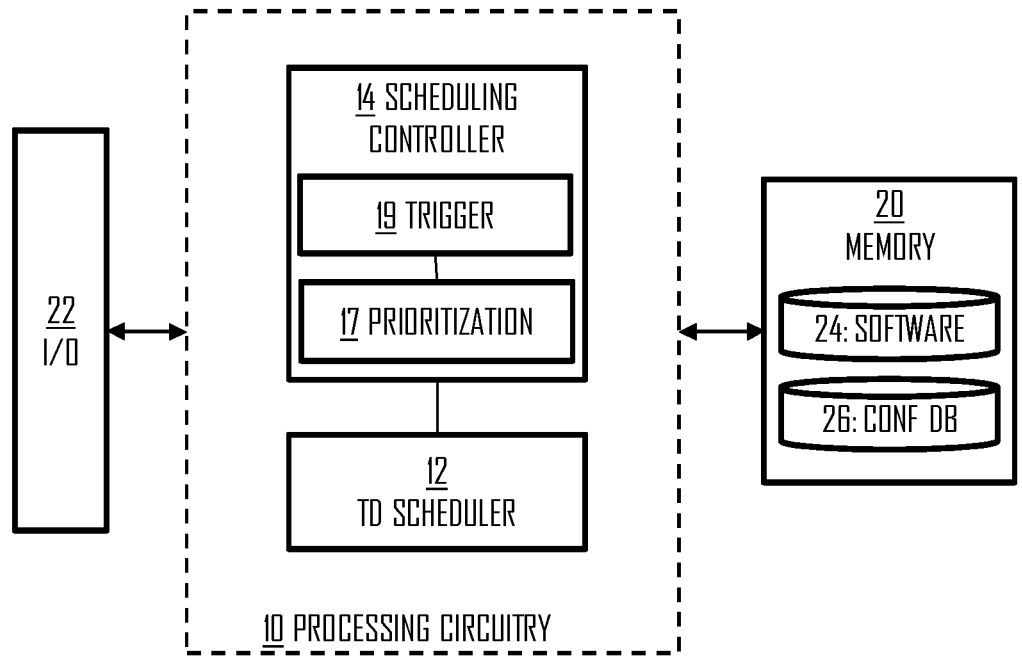
FIGS. 8 and 9 illustrate examples of apparatuses implementing embodiments of the invention.

FIG. 8 illustrates an embodiment of a structure of the above-mentioned functionalities of an apparatus executing the functions of the TD scheduler in the embodiments described above, e.g. the process of FIG. 3 or any one of its embodiments. The apparatus may be comprised in the RRH or FEU, for example. In an embodiment, the apparatus carrying out the above-described functionalities comprises a circuitry such as a chip, a chipset, a processor, a micro controller, or a combination of such circuitries in the RRH, FEU or another network element of the RAN. The apparatus may be an electronic device comprising electronic circuitries for realizing some embodiments of the present invention.

Referring to FIG. 8, the apparatus may comprise at least one processor or a processing circuitry 10. The processing circuitry 10 may employ a communication interface 22 to communicate with at least the FD scheduler and, in some embodiments, with the terminal devices. In the former case, the communication interface may support an interface of the (cloud) RAN, for example. In the latter case, the communication interface may comprise a radio interface providing the apparatus with radio communication capability. The radio interface may comprise radio frequency converters and components such as an amplifier, filter, frequency-converter, (de)modulator, and encoder/decoder circuitries and one or more antennas. The radio interface may comprise a radio modem configured to carry out transmission and reception of messages in the cell.

The processing circuitry 10 may comprise a scheduling controller 14 configured to control the TD scheduling and acquisition of the FD resources from the FD scheduler. The scheduling controller 14 may comprise a triggering module 19 configured to trigger the generation of the scheduling request. The triggering module may be configured to perform block 300 and enable a prioritization module 17 to apply the scheduling policy of the TD scheduler to define the local priority for the bearer/UE for which the TD scheduling has been triggered. The prioritization module 17 may be configured to carry out the conversion between the local priority value and the priority indicator on the standard scale. Thereafter, the scheduling controller may use the communication interface to deliver the scheduling request to the FD scheduler. Upon receiving the scheduling response from the FD scheduler and the FD resource allocation, the scheduling controller 14 may control a TD scheduler 12 to perform the TD scheduling on the scheduler FD resources. In the embodiments where the FD scheduler sends the scheduling response on the lower protocol layers, the FD scheduler may provide the scheduling response directly to the TD scheduler 12.

The processing circuitry 10 may comprise at least one processor. The apparatus may further comprise a memory 20 storing one or more computer program products 24 configuring the operation of said processor(s) of the apparatus. The memory 20 may further store a configuration database 26 storing operational configurations of the apparatus. The configuration database 26 may, for example, store the priority range and the scheduling policy and, in some embodiments, the conversion rule for the priority indicator.

Figure 9:
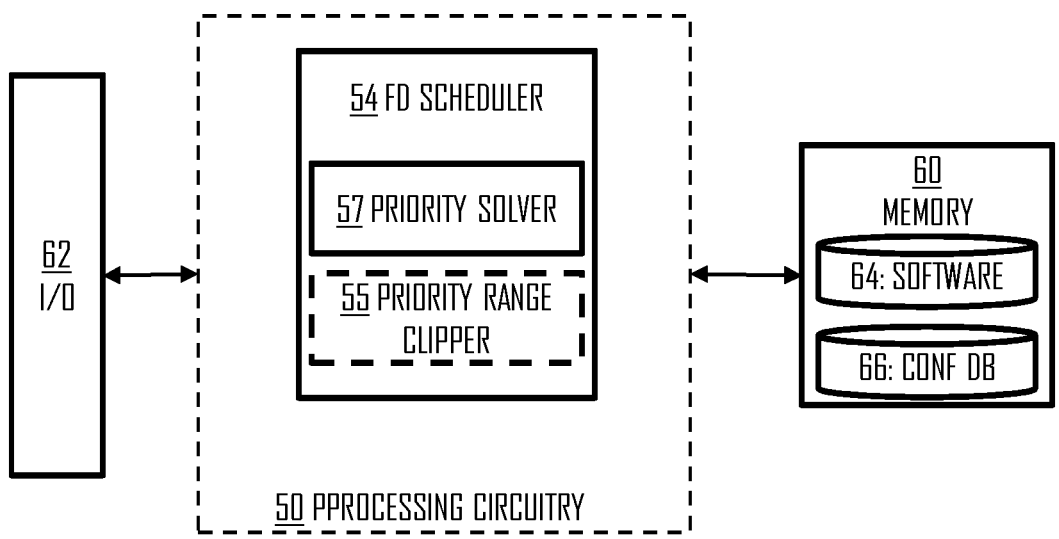

FIG. 9 illustrates an apparatus for the FD scheduler, comprising a processing circuitry 50, such as at least one processor, and at least one memory 60 including a computer program code (software) 64, wherein the at least one memory and the computer program code (software) are configured, with the at least one processor, to cause the apparatus to carry out the process of FIG. 2 or any one of its embodiments described above. The apparatus may be comprised in the FEU, for example. The apparatus of FIG. 9 may be an electronic device.

Referring to FIG. 9, the memory 60 may be implemented using any suitable data storage technology, such as semiconductor based memory devices, flash memory, magnetic memory devices and systems, optical memory devices and systems, fixed memory and removable memory. The memory may comprise a configuration database 66 for storing configuration parameters, e.g. the parameters for performing the FD scheduling or solving the different priorities in the received scheduling requests.

The apparatus may further comprise a communication interface 62 comprising hardware and/or software for realizing communication connectivity with the TD schedulers according to one or more communication protocols. The communication interface 62 may support an interface of the (cloud) RAN according to 5G specifications, for example.

The processing circuitry 50 may comprise a FD scheduler circuitry 54 configured to execute the process of FIG. 3 or any one of its embodiments for performing the FD scheduling. The FD scheduler 54 may comprise, as sub-circuitries, a priority solver 57 and optionally a priority range clipper circuitry 55. The priority clipper 55 may be configured to execute the process of FIG. 7. The priority solver may be configured to solve the priorities of the received scheduling requests by using the received priority indicators that are provided on the common scale. The priority solver 57 may carry out the FD scheduling of the available FD resources in a determined priority order of the scheduling requests, as defined by the priority indicators. The scheduling requests may be received from the TD schedulers via the communication interface 62, and the scheduling responses may be transmitted to the TD schedulers through the communication interface 62.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable gate array (FPGA) circuit for the apparatus according to an embodiment of the invention. The processes or methods described in connection with FIGS. 2 to 7 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks, or even to other networks that are wired networks using a shared transmission medium. An example of such a wired network is a passive optical network (PON). An architecture of a PON implements a point-to-multipoint topology where an optical fiber is shared by multiple endpoints by using unpowered, i.e. passive, fiber optic splitters to divide (i.e. to schedule) the fiber bandwidth among multiple access points. Analogy with the embodiments of the wireless network described above is obvious and, thus, the principles described above may be applied to PONs or other network having a similar architecture. The protocols used, the specifications of the wireless and wired networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a frequency domain scheduler of a network, comprising a memory storing computer program code and a processor, the memory and the computer program code being configured to cause, with the processor, the apparatus to perform:

receiving, from a first time domain scheduler employing a first scheduling policy to schedule time domain resources, a first scheduling request comprising a first priority indicator;

receiving, from a second time domain scheduler employing a second scheduling policy different from the first scheduling policy, a second scheduling request comprising a second priority indicator provided on the same scale as the first priority indicator, wherein the first priority indicator is within a first priority range assigned to the first time domain scheduler, and the second priority indicator is within a second priority range assigned to the second time domain scheduler, and wherein the first priority range differs from the second priority range; and scheduling frequency domain resources to the first time domain scheduler and the second time domain scheduler on the basis of the first priority indicator and the second priority indicator.

2. The apparatus of claim 1, wherein the first priority indicator is within a first priority range assigned to the first time domain scheduler, and the second priority indicator is within a second priority range assigned to the second time domain scheduler, and wherein the apparatus is further caused to clip at least one of the first priority range and the second priority range.

3. The apparatus of claim 1, wherein the apparatus is further caused to schedule frequency domain resources to the first and second time domain schedulers within a cell of the network where the first time domain scheduler schedules time domain resources within a first network slice in the cell and where the second time domain scheduler schedules time domain resources within a second network slice in the cell.

4. The apparatus of claim 1, wherein the apparatus is further caused to receive, before performing said scheduling, multiple scheduling requests from each of the first time domain scheduler and the second time domain scheduler, each of the multiple scheduling requests being associated with a different transmission request from a terminal device and the multiple scheduling requests comprising various priority indicators, and to schedule the frequency domain resources per scheduling request on the basis of the priority indicators.

5. The apparatus of claim 1, wherein the first priority indicator indicates a higher priority on the scale than the second priority indicator, and the apparatus is further caused to schedule the frequency domain resources to the first time domain scheduler before scheduling the frequency domain resources to the second time domain scheduler.

6. The apparatus of claim 1, wherein the apparatus is further caused to perform the frequency-domain scheduling per transmission time interval of the network.

7. An apparatus for a time domain scheduler of a network, comprising a memory storing computer program code and a processor, the memory and the computer program code being configured to cause, with the processor, the apparatus to perform:
determining to schedule a time-frequency resource to a terminal device;
in response to said determining, determining a scheduling priority of the terminal device according to a scheduling policy of the apparatus and computing, on the basis of the scheduling priority, a priority indicator provided on a normalized scale common with at least one other time domain scheduler using the same frequency domain scheduler;
storing and using a priority range limiting the possible values of the priority indicator;
transmitting a scheduling request to a frequency domain scheduler, the scheduling request comprising the priority indicator;
receiving, from the frequency domain scheduler a scheduling response indicating a frequency domain resource scheduled to the apparatus;
scheduling time domain resources from the frequency domain resource to the terminal device according to the scheduling policy.

8. The apparatus of claim 7, wherein the apparatus is further caused to schedule time domain resources of one of multiple network slices in the cell, and wherein the frequency domain scheduler is common to multiple time domain schedulers associated with different network slices in the cell.

9. A method for a frequency domain scheduler of a network, comprising:
receiving, by the frequency-domain scheduler from a first time domain scheduler employing a first scheduling policy to schedule time domain resources, a first scheduling request comprising a first priority indicator;
receiving, by the frequency-domain scheduler from a second time domain scheduler employing a second scheduling policy different from the first scheduling policy, a second scheduling request comprising a second priority indicator provided on the same scale as the first priority indicator, wherein the first priority indicator is within a first priority range assigned to the first time domain scheduler, and the second priority indicator is within a second priority range assigned to the second time domain scheduler, and wherein the first priority range differs from the second priority range; and
scheduling, by the frequency-domain scheduler, frequency domain resources to the first time domain scheduler and the second time domain scheduler on the basis of the first priority indicator and the second priority indicator.

10. The method of claim 9, wherein the first priority indicator is within a first priority range assigned to the first time domain scheduler, and the second priority indicator is within a second priority range assigned to the second time domain scheduler, and wherein the frequency-domain scheduler clips at least one of the first priority range and the second priority range.

11. The method of claim 9, wherein the frequency-domain scheduler schedules frequency domain resources to the first and second time domain schedulers within a cell of the network where the first time domain scheduler schedules time domain resources within a first network slice in the cell and where the second time domain scheduler schedules time domain resources within a second network slice in the cell.

12. The method of claim 9, wherein the frequency-domain scheduler receives, before performing said scheduling, multiple scheduling requests from each of the first time domain scheduler and the second time domain scheduler, each of the multiple scheduling requests being associated with a different transmission request from a terminal device and the multiple scheduling requests comprising various priority indicators, and schedules the frequency domain resources per scheduling request on the basis of the priority indicators.

13. The method of claim 9, wherein the first priority indicator indicates a higher priority on the scale than the second priority indicator and, as a response, the frequency-domain scheduler schedules the frequency domain resources to the first time domain scheduler before scheduling the frequency domain resources to the second time domain scheduler.

14. The method of claim 9, wherein the frequency-domain scheduling is performed per transmission time interval of the network.

* * * * *